UNITED STATES PATENT OFFICE.

CARLETON ELLIS, OF MONTCLAIR, NEW JERSEY, ASSIGNOR, BY MESNE ASSIGNMENTS, TO SETH B. HUNT, TRUSTEE, OF MOUNT KISCO, NEW YORK.

PROCESS OF OXIDIZING OLEFINES, ETC.

1,418,368. Specification of Letters Patent. Patented June 6, 1922.

No Drawing. Application filed May 17, 1918. Serial No. 235,118.

*To all whom it may concern:*

Be it known that I, CARLETON ELLIS, a citizen of the United States, and a resident of Montclair, in the county of Essex and State of New Jersey, have invented certain new and useful Improvements in Processes of Oxidizing Olefines, Etc., of which the foling is a specification.

This invention relates to a method of oxidizing olefines or bodies derived from olefines by employing as the oxidizing agent nitric acid or any other suitable oxygen containing compound of nitrogen.

The first step in the process is that of preparing the acid extract which may be carried out by dissolving the olefine in sulphuric acid of a strength ranging from say 1.7 to 1.8 specific gravity. The olefine material is added to or incorporated with the sulphuric acid with cooling and agitation yielding a solution of alkyl hydrogen sulphate or similar product which is hereinafter termed acid extract. Olefines obtained from any suitable source may be employed, but preferably those produced in the cracking of gasoline are employed herein.

In one case an acid extract was made by treating 135 c. c. of sulphuric acid of 1.8 specific gravity with cracked gasoline material containing olefines boiling up to about 85° C. until an acid extract was obtained which contained 88 grams of olefines extracted from the olefine containing material. This was diluted with 45 c. c. of water and the diluted acid extract was subjected to the oxidizing action of nitric acid of about 1.3 specific gravity. To 100 c. c. of the nitric acid the acid extract was added drop by drop with stirring. The liquid heated up and gave off some fumes of oxides of nitrogen. The temperature during this operation was held between 30° and 40° C. The latter portions of the extract did not react as vigorously on contact with the nitric acid. The product obtained was distilled with steam and the first portion of the distillate contained an oil which separated from the water forming an upper layer. This oil was light yellow in color and was inflammable. It dissolved nitrocellulose. When shaken up with acid sodium sulphite a precipitate was obtained showing the presence of ketones. 80% of the oil was soluble in sulphuric acid of 1.57 specific gravity while the original olefine material taken was not soluble in sulphuric acid of this strength. The solution of the oxidized product in 1.57 specific gravity sulphuric acid was diluted with water and separated and was also found to dissolve nitrocellulose.

Toward the end of the steam distillation during the period when the oil was passing over into the receiver a heavier and darker colored oil was separately collected which could not be readily ignited unless heated. It proved to be a fairly good solvent for celluloid. About 15 c. c. of this oil was obtained. No precipitate was produced with acid sodium sulphite.

The light oil comprising the first runnings of the distillate with steam amounted to about 45 c. c. and had a specific gravity of about .84.

The degree of dilution of the acid extract in carrying out this oxidation operation may be regulated according to the strength of the nitric acid or other conditions. The preferred procedure is to form the acid extract in sulphuric acid stronger than that actually required to carry out the oxidation and to subsequently dilute to a degree suited for the character of oxidation in hand. In making such dilution it is desirable to avoid the separation of alcohols which may form by hydrolysis. Either the acid extract may be moderately diluted stopping short of the point at which alcohols may be separated; or the extract may be poured into an excess of water in which any alcohols if formed, will largely dissolve, and in which medium the oxidation may take place.

However the present invention is not limited to the oxidation of the acid extract per se but as a raw material the alcohols themselves as produced by hydrolysis of the acid extract may be employed in a pure state or admixed with hydrocarbons. For example if on dilution of acid extract some of the water-insoluble alcohols are formed and separate, while the water-soluble ones remain in solution, the nitric acid may be incorporated with this mixture.

The addition of the nitric acid may be made to the acid extract or alcohol solution or mixtures of alcohols, etc., in place of adding the acid extract or alcohols to the nitric acid.

Alcohols which have already been prepared may be dissolved in sulphuric acid of a strength say 1.5 to 1.7 specific gravity and suitably diluted if desired when they may be treated with nitric acid or equivalent oxidizing mixture.

To avoid actual nitration of the alcohol or acid extract material a sufficient degree of dilution should be maintained. Ordinarily however, a certain amount of nitro compounds may be formed which may be subsequently hydrolyzed or saponified with alkali when their presence is objectionable.

Another feature of the process consists in the use of a salt of nitric acid such as sodium nitrate or a salt of nitrous acid such as sodium nitrite as the source of oxidizing material. The salt in the dry state or in solution, as may be desired, being added to the acid extract whereupon the sulphuric acid liberates nitric or nitrous acids respectively and the oxidation is inaugurated; or if desired the acid extract in a suitable degree of dilution is added to sodium nitrate or nitrite or mixtures of these or to a solution thereof, which is suitably heated or cooled, depending on the violence of the reaction and the oxidation products desired. The liberation of the nitric or nitrous acids in a nascent condition favors the oxidation.

The oxidation products obtained herein correspond in part at least to the olefines originally present in the cracked gasoline or other raw material employed. The hydrolysis of alkyl hydrogen sulphate obtained in this manner yields a large proportion of secondary alcohols which may be oxidized to ketones. These will correspond to the alcohols from which they are derived to a considerable degree, at least, although a certain amount of destructive oxidation may occur so that the correspondence is not exact. Likewise the more effective oxidation produces fatty acids which generally speaking will have a lesser number of carbon atoms than the original olefine or alcohol. In the case of the illustrative procedure outlined above, a considerable amount of fatty acid was obtained including a major proportion of acetic with other higher fatty acids; and the invention comprises the product of oxidation of such olefine or alcohol material by means of nitric or nitrous acids either in a nascent or non-nascent condition to produce mixtures containing ketones or fatty acids or both.

What I claim is:

1. The process of producing ketones and fatty acids from acid extract of olefines of cracked petroleum which comprises treating the diluted extract with nitric acid.

2. The process of producing ketones and fatty acids from sulfuric acid extract of olefines of cracked petroleum which comprises treating same with nitric acid.

3. The process of producing ketones and fatty acids from acid extract of olefines of cracked petroleum which comprises treating same with an oxygen containing compound of nitrogen.

4. The process of producing ketones and fatty acids from sulfated derivatives of olefines which comprises diluting same and treating with an oxygen containing compound of nitrogen.

5. The process of producing ketones and fatty acids from sulfated derivatives of olefines, which consists in adding water to such sulfated derivatives and introducing the mixture into nitric acid.

6. The process of preparing ketonic bodies, which includes subjecting acid extract comprising the sulfated derivatives of olefines of cracked gasoline extracted by means of sulfuric acid of a strength equivalent to that of aqueous sulfuric acid of about 1.8 specific gravity, to the action of nitric acid of a strength less than that corresponding to aqueous nitric acid of 1.3 specific gravity.

CARLETON ELLIS.